(12) United States Patent  (10) Patent No.: US 7,562,902 B2
Osterhout  (45) Date of Patent: Jul. 21, 2009

(54) SIDE AIRBAG SEAT REINFORCEMENT POCKET

(75) Inventor: Neal Osterhout, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/844,563

(22) Filed: Aug. 24, 2007

(65) Prior Publication Data

US 2009/0051148 A1 Feb. 26, 2009

(51) Int. Cl.
B60R 21/16 (2006.01)
B60R 21/207 (2006.01)

(52) U.S. Cl. .............. 280/730.2; 280/743.1; 280/728.1

(58) Field of Classification Search .............. 280/730.2, 280/728.2, 728.3, 743.1, 728.1; 53/429, 53/430, 116; 206/522, 524.8; 383/86.1, 383/86.2, 92; 297/216.13, 216.1
See application file for complete search history.

(56) References Cited

U.S. PATENT DOCUMENTS

| 748,209 | A | * | 12/1903 | McClay | 383/86.1 |
| 2,392,062 | A | * | 1/1946 | Quackenbush | 383/85 |
| 4,783,978 | A | * | 11/1988 | Vallerga | 70/65 |
| 5,061,086 | A | * | 10/1991 | Vallerga | 383/16 |
| 5,498,030 | A | * | 3/1996 | Hill et al. | 280/743.1 |
| 6,045,151 | A | * | 4/2000 | Wu | 280/728.3 |
| 2006/0113765 | A1 | | 6/2006 | Tracht | |

FOREIGN PATENT DOCUMENTS

| GB | 2 420 749 A | 7/2006 |
| GB | 2 420 753 A | 7/2006 |

\* cited by examiner

*Primary Examiner*—Ruth Ilan
(74) *Attorney, Agent, or Firm*—Young Basile

(57) ABSTRACT

A side airbag seat reinforcement pocket is defined by at least one sheet of material having a peripheral edge and being divided into at least three major surface portions along first, second and third fold lines. The first major surface portion includes at least one first aperture adjacent a first edge and an edge to be sewn into a seat trim cover seam along a second edge opposite from the first edge. The second major surface portion has at least one second aperture formed adjacent peripheral edge. The third major surface portion has at least one third aperture formed adjacent the peripheral edge. The first, second and third apertures are located in coaxial alignment with respect to one another when the second and third major surface portions are folded to define an enclosed pocket in five directions with an opening in a sixth direction.

19 Claims, 5 Drawing Sheets

SIDE AIRBAG SEAT REINFORCEMENT POCKET

FIELD OF THE INVENTION

The present invention relates to a vehicle seat having a side airbag with a reinforcement pocket to concentrate the force of an inflating airbag at a deployment seam in the seat cover.

BACKGROUND

Reinforcement of pockets, sometimes referred to as force concentrators, are generally known in the art. For example, U.S. Pat. No. 6,045,151 includes a force concentrator that at least partially surrounds a folded airbag and concentrates or directs the force of an inflating airbag to the designed deployment seam. The force concentrator is made from inelastic material to avoid application of airbag deployment force on the seat trim cover material. This patent discloses two panels to form the force concentrator and may require that multiple pieces be joined together by seams. The patent also discloses that a single panel may work on only one side of the deployment seam.

SUMMARY

It is desirable in the present invention to provide a seat airbag reinforcement pocket that is easy to assemble while providing proper control of the speed of deployment and deployment location in a predictable fashion. A side airbag seat reinforcement pocket can include at least one sheet of material having a peripheral edge and divided into at least three major surface portions. A first major surface portion has at least one first aperture formed adjacent a first portion of the peripheral edge of the at least one sheet and an edge to be sewn into a seat trim cover seam along a second portion of the peripheral edge opposite from the first portion. The second major surface portion has at least one second aperture formed adjacent a second portion of the peripheral edge of the at least one sheet. The second major surface portion can be folded along a first fold line between the first and second major surface portions in opposing relationship to the first major surface portion. A third major surface portion has at least one third aperture formed adjacent a third portion of the peripheral edge of the at least one sheet. The third major surface portions can be folded along a second fold line between the first and third major surface portions in opposing relationship to the second major surface portion. The at least one first, second, and third apertures are located in coaxial alignment with respect to one another when the second and third major surface portion is are folded about the first and second fold lines, such that the first, second, and third major surface portions substantially define an enclosed pocket.

The side airbag seat reinforcement pocket can include at least one flexible panel of material having a first fold line, a second fold line, and a third fold line. The first fold line extends between a major first surface portion and a second major surface portion. The second major surface portion can be folded along the first fold line to be positioned in opposing relationship with respect to the first major surface portion of the at least one panel. The second fold line extends between the first major surface portion and a third major surface portion. The third major surface portion can be folded along the second fold line to be positioned with the second major surface portion interposed between the first and third major surface portions. The third fold line extends between a primary portion of the first major surface portion and a secondary portion of the first major surface portion. The secondary portion can be folded along the third fold line to be positioned with at least a portion of the third major surface portion interposed between the secondary portion and the second major surface portion, such that, in a folded position, the first, second, and third major surface portions of the at least one panel substantially form a pocket closed in five directions along the first, second, and third fold lines between the first, second, and third major surface portions, and with an opening in a sixth direction to be connected to an airbag deployment seam through vehicle seat trim cover. Each of the first, second, and third major surface portions including at least one aperture alignable, coaxially with one another when in the folded position.

A vehicle seat can include frame, a pad covering at least a portion of the frame, and a cover material extending over a least a portion of the pad. The cover material can include an airbag deployment seam. A reinforcement pocket can be anchored to the frame and extend through the pad toward the deployment seam. The reinforcement pocket can include peripheral edge portions connected to opposite, sides of the airbag deployment seam through the seat trim cover for directing airbag deployment forces through the deployment seam. The reinforcement pocket can include a first flexible panel material having a first major surface and a peripheral edge and at least one aperture formed adjacent a first portion of the peripheral edge, and a second flexible panel material having a first fold line, second fold line, and third fold line. The first fold line defines a first portion of a second major surface to be positioned in opposing relationship with respect, to the first major surface of the first panel. The second fold line defines a second portion of a second major surface to be folded along a second portion of the peripheral edge of the first panel. The third fold line defines a third portion of the second major surface to be folded along a third portion of the peripheral edge of the first panel. The first fold line defines a fourth portion of the second major surface to be folded along the first portion of the peripheral edge of the first panel. Such that the first, second, third, and fourth portions of the second flexible panel substantially enclose the first panel forming a pocket substantially closed in five directions along the first, second, and third portion of the peripheral edge and the first and second major surfaces, and with an opening in a sixth direction to be connected to an airbag deployment seam through a vehicle seat trim cover. The second, third, and fourth portions having a corresponding number of apertures to the number of apertures formed adjacent the first portion of the peripheral edge of the first panel and when folded, each aperture coaxially aligns with a corresponding aperture formed in the first flexible panel. A side, airbag in a folded condition is stowed within the pocket defined between the first and second panels. An inflator in communication with the side airbag is provided for inflating the side airbag to a deployed condition extending Out of the pocket. The inflator is stored within the pocket defined between the first and second panels. At least one inflator housing stud extends outwardly through the coaxially aligned apertures for engagement with the seat frame member.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
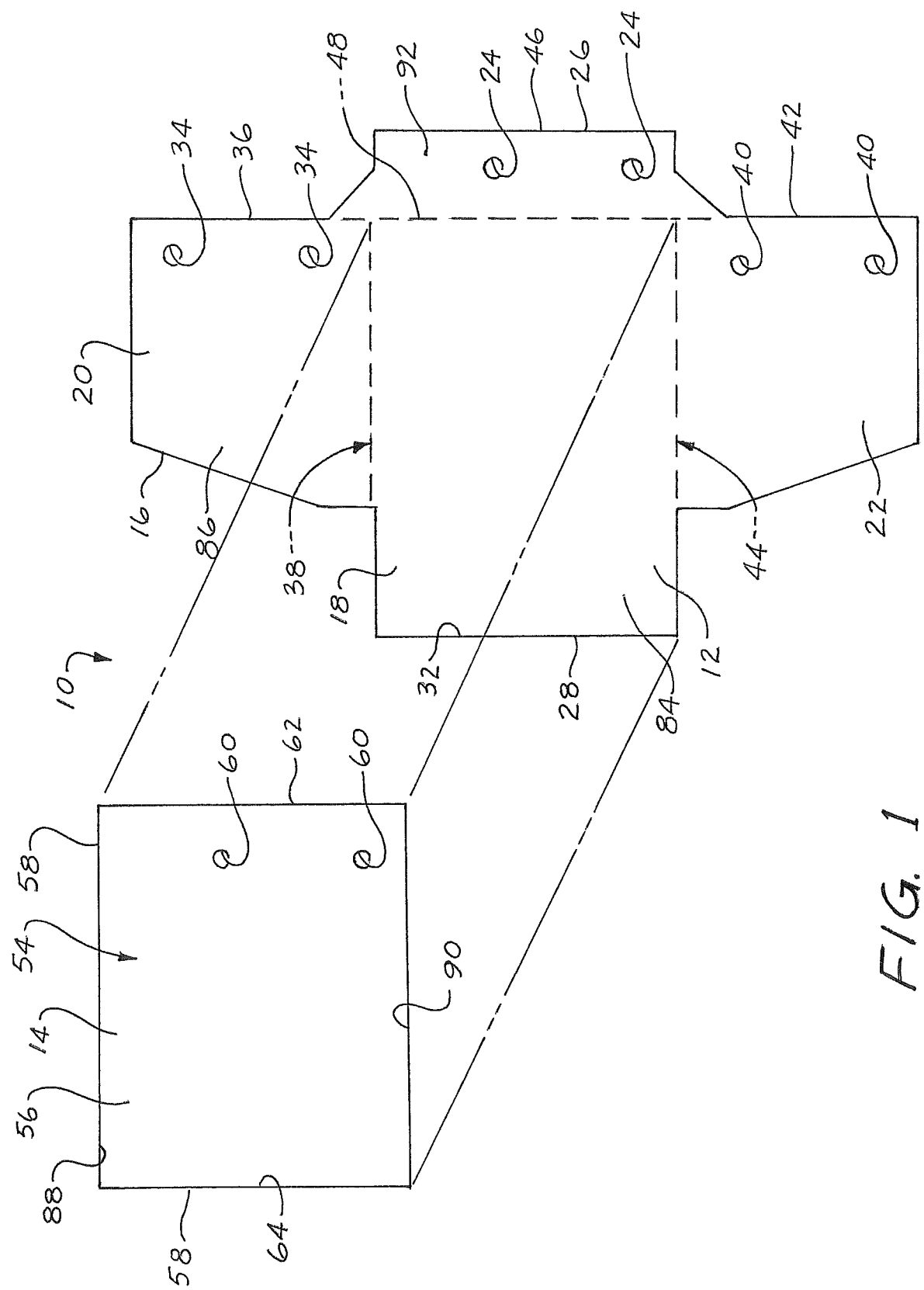
FIG. 1 is an exploded view of a side airbag seat reinforcement pocket according to one embodiment of the present invention.
Figure 5:
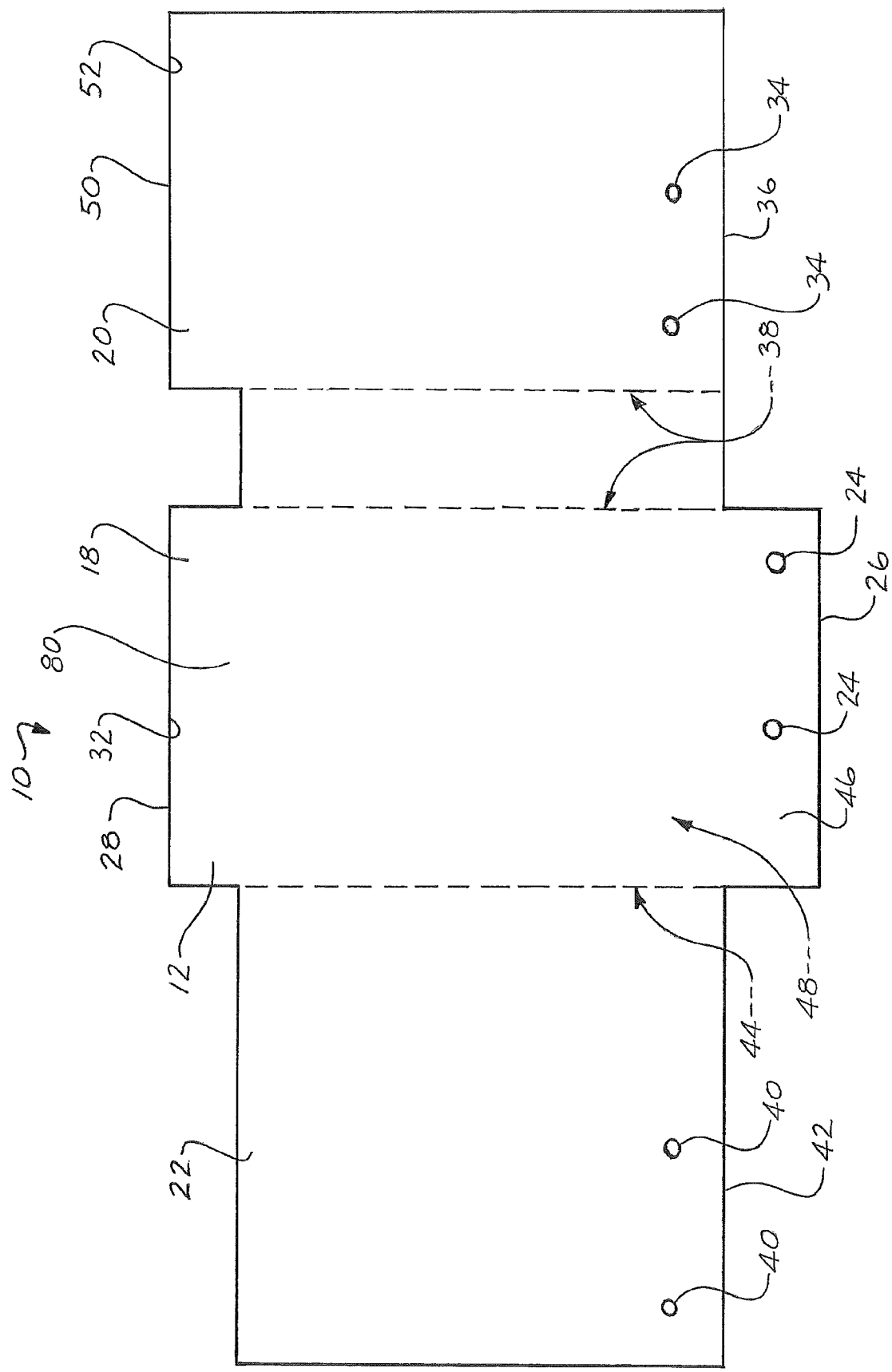
FIG. 5 is a plan view of a side airbag seat reinforcement pocket formed of a single sheet of material according to a second embodiment of the invention.

Referring now generically to FIGS. 1 and 5, a side airbag seat reinforcement pocket 10 can include at least one sheet of material 12, 14, having a peripheral edge 16 and divided into three major surface portions 18, 20, and 22. A first major surface portion 18 can have at least one first aperture 24 formed adjacent a first portion 26 of the peripheral edge 16 of the at least one sheet 12, 14 and an edge 28 to be sewn into a seat trim cover seam 30 along a second portion 32 of the peripheral edge 16 opposite from the first portion 26. A second major surface portion 20 can have at least one second aperture 34 formed adjacent a third portion 36 of the peripheral edge 16 of the at least one sheet 12, 14. The second major surface portion 20 can be folded along a first fold line 38 between the first and second major surface portions 18, 20 to locate the second major surface portion 20 in opposing relationship with respect to the first major surface portion 18. A third major surface portion 22 can have at least one third aperture 40 formed adjacent a fourth portion 42 of the peripheral edge 16 of the at least one sheet 12, 14. The third major surface portion 22 can be folded along a second fold line 44 between the first and third major surface portions 18, 22 to locate the third major surface portion 22 in opposing relationship with respect to the second major surface portion 20. The at least one first, second, and third apertures 24, 34, 40 are located in coaxial alignment with respect to one another when the second and third major surface portions 20, 22 are folded about the first and second fold lines 38, 44, such that the first, second, and third major surface portions 18, 20, 22 substantially define an enclosed pocket.

The first major surface portion 18 can include a first minor surface, portion 46. The first minor surface portion 46 can be folded along a third fold line 48 to be located in opposing relationship to the third major surface portion 22 to locate the at least one first aperture 24 in coaxial alignment with the at least one second and third apertures 34, 40. The minor surface portion 46 defined by the third fold line 48 in the first major surface portion 18 having a corresponding number of apertures 24 to the number of apertures 34, 40 formed adjacent the second and third major surface portions 20, 22 and, when folded in opposing relationship to the third major surface portion 22, each aperture 24 coaxially aligning with a corresponding aperture 34, 40 formed in the second and third major surface portions 20, 22 of the at least one sheet 12, 14. The second major surface portion 20 having a corresponding number of apertures 34 to the number of apertures 24 formed adjacent the first portion 26 of the peripheral edge 16 of the first major surface portion 18 and, when folded, each aperture 34 coaxially aligning with a corresponding aperture 24 formed in the first major surface portion 18 of the at least one sheet 12, 14. The third major surface portion 22 of the at least one sheet 12, 14 can have a corresponding number of apertures 40 to the number of apertures 24 formed adjacent the first portion 26 of the peripheral edge 16 of the first major surface portion 18 and, when folded, each aperture 40 coaxially aligning with a corresponding aperture 24 formed in the first major surface portion 18 of the at least one sheet 12, 14. As illustrated in FIG. 5, the second major surface portion 20 can have an edge 50 to be sewn into a seat trim cover seam 30 along a portion 52 of the peripheral edge 16 of the at least one sheet 12, 14 opposite from the third portion 36.

Referring now to FIG. 1, the at least one sheet of material 12, 14 can include a first sheet 12 and second sheet 14 of material. The first sheet 12 can define the at least three major surface portions 18, 20, 22. The second sheet, 14 can define a first flexible panel 54 with a first surface 56 and a peripheral edge 58. At least one aperture 60 can be formed adjacent a portion 62 of the peripheral edge 58. The first, second, and third major surface portions 18, 20, 22 of the first sheet 12 substantially enclose the second sheet 14, when the second sheet is located in an opposing relationship with respect to the first sheet 12, and the second and third major surface portions 20, 22 of the first sheet 12 are folded over the second sheet 14 along the first and second fold lines 38, 44. The second sheet 14 can have an edge 58 to be sewn into a seat trim cover seam 30 along a portion 64 of the peripheral edge 58 opposite from the portion 62 with at least one aperture 60 formed adjacent thereto.

Figure 2:
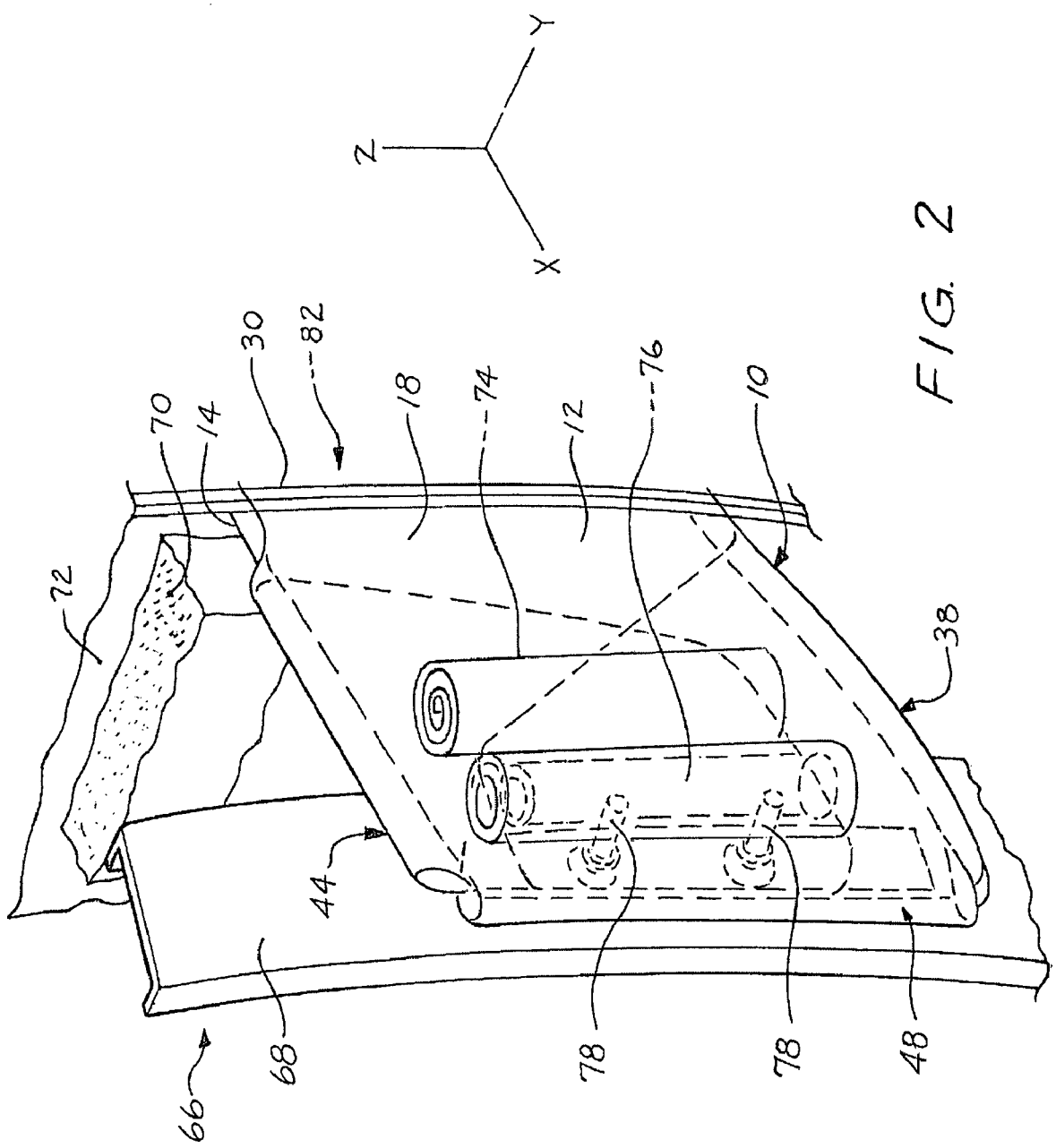
FIG. 2 is a perspective view of a folded side airbag seat reinforcement pocket enclosing a folded side airbag curtain inflator, inflator housing with studs extending through apertures formed in the folded side airbag seat reinforcement pocket for engagement with a vehicle seat frame, and defining an opening connected to a seat airbag deployment seam formed through the vehicle seat trim cover.
Figure 3:
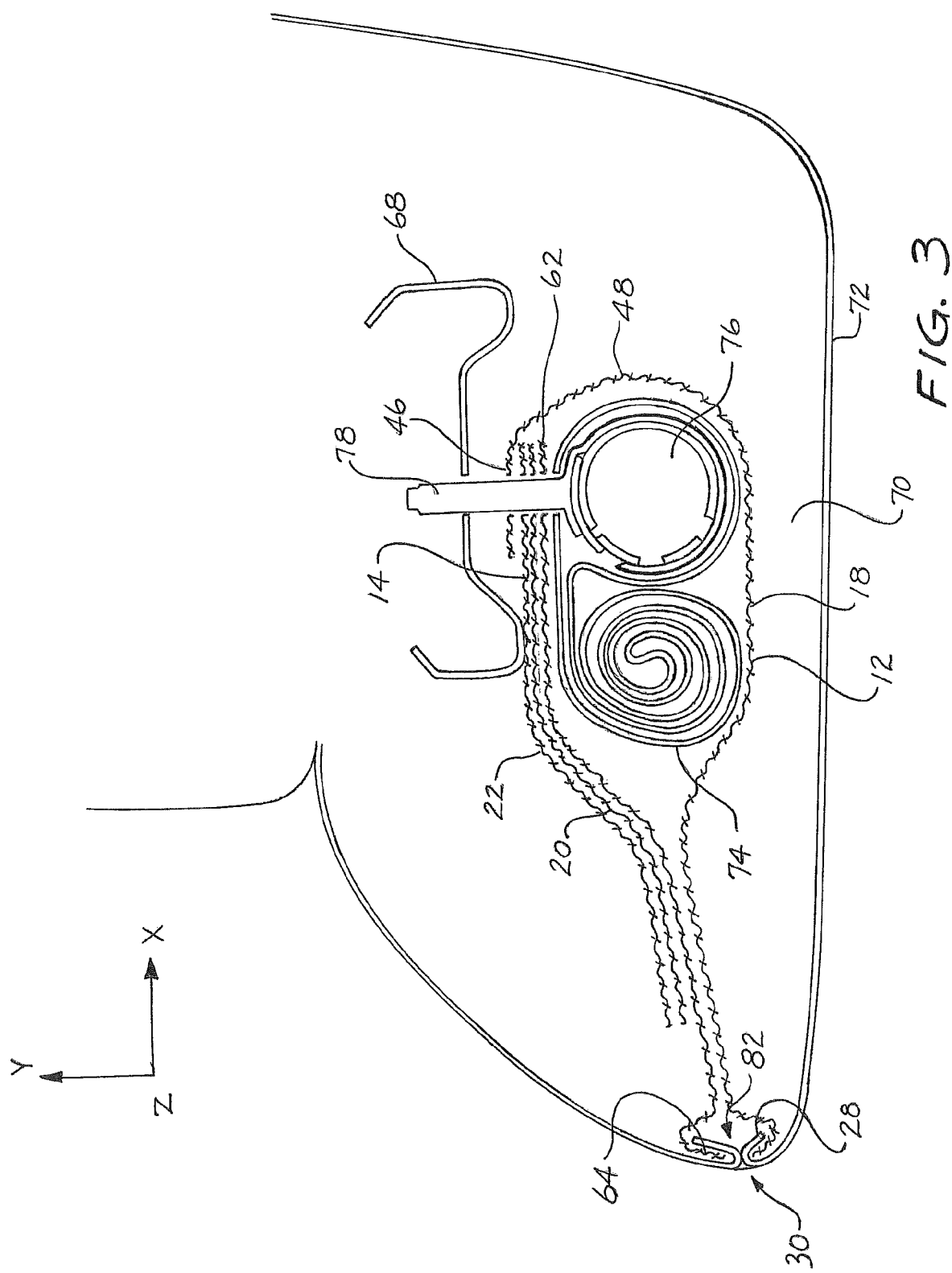
FIG. 3 is a cross-sectional view of a folded side airbag seat reinforcement pocket installed within a vehicle seat.
Figure 4:
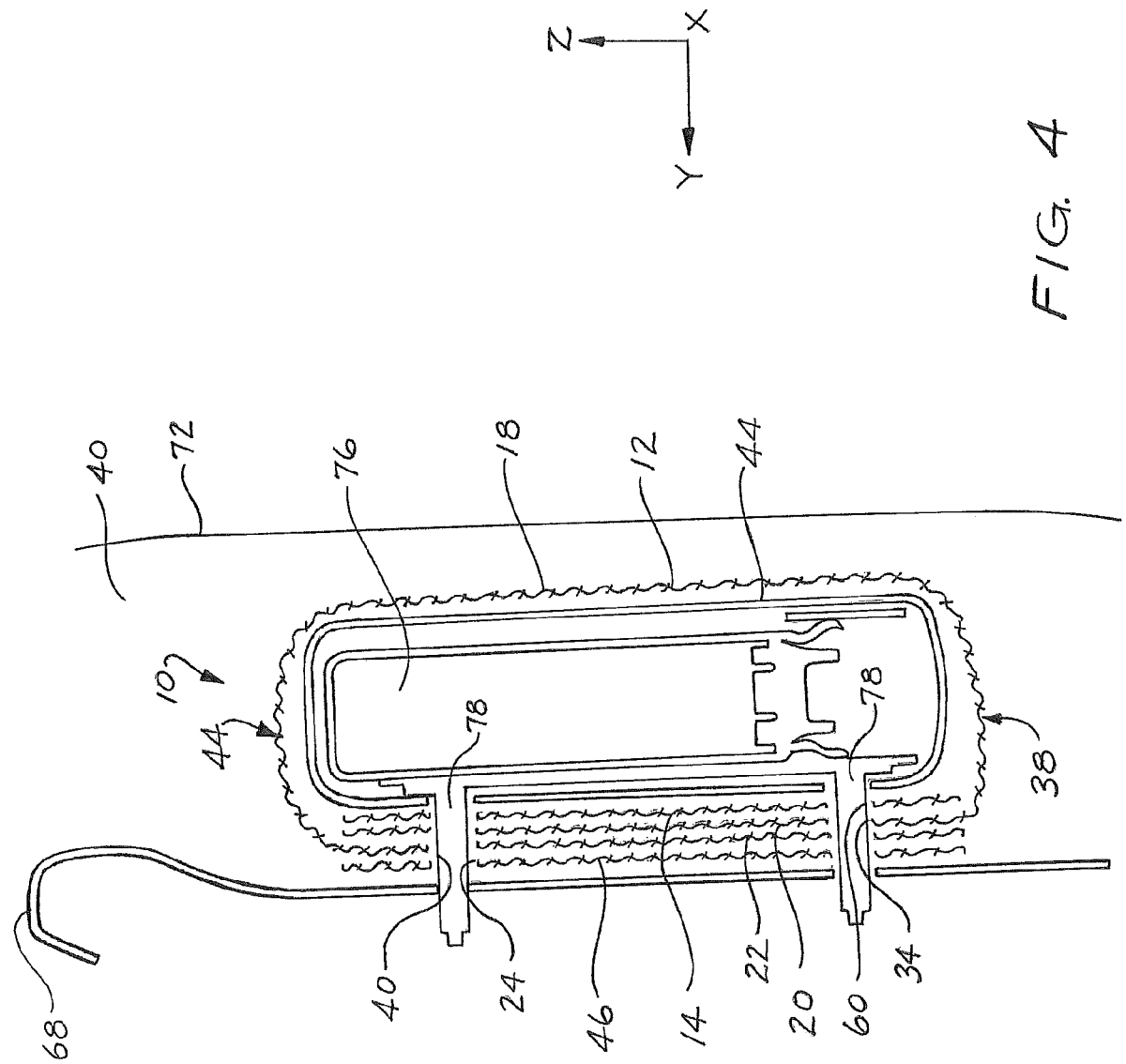
FIG. 4 is a elevational cross sectional view of a folded side airbag seat reinforcement pocket installed within a vehicle seat.

Referring now to FIGS. 2-4, a vehicle seat 66 can include a frame 68, a pad 70 covering at least a portion of the frame 68, and a cover material 72 extending over at least a portion of the pad 70. The cover material 72 can have an airbag deployment seam 30 formed therein. The first and second major surface portions 18, 20 define a pocket 10. The pocket 10 can be anchored to the frame 68 and extends through the pad 70 toward the deployment seam 30. The at least one sheet 12, 14 can have peripheral edge portions 32, 64 connected to opposite sides of the deployment seam 30 through the cover 72 for directing airbag deployment force toward the deployment seam 30. A portion 32, 64 of the peripheral edges 16, 58 of the first and second major surface portions 18, 20 of the at least one sheet 12, 14 can be connected to opposite sides of the air deployment seam 30 through the seat trim cover 72. The first and second major surface portions 18, 20 direct airbag deployment force toward the deployment seam 30. A side airbag 74 can be stowed in a folded condition within the pocket 10 defined between the first and second major surface portions 18, 20 of the at least one sheet 12, 14. An inflator 76 can be provided in communication with the side airbag 74 for inflating the side airbag 74 to a deployed condition extending out of the pocket 10. The inflator 76 can be stored within the pocket 10 defined between the first and second major surface portions 18, of the at least one sheet 12, 14. At least one inflator housing stud 78 can extend outwardly from the inflator 76 through the coaxially aligned apertures 24, 34, 40 for engagement with seat frame member 68.

Referring again to FIGS. 1 and 5, a side airbag reinforcement pocket 10 can include at least one flexible panel or sheet 12, 14 of material having a first fold line 38 a second fold line 44, and a third fold line 48. The first fold line 38 extending between a first major surface portion 18 and a second major surface portion 20 the second major surface portion 20 can be positioned in opposing relationship with respect to the first major surface portion 18 of the at least one panel 12, 14. The second fold line 44 extends between the first major surface portion 18 and a third major surface portion 22. The third major surface portion 22 can be folded along the second fold line 44 to be positioned with the second major surface portion 20 interposed between the firsthand third major surface portions 18, 22. The third fold line 48 extends between a primary portion 80 of the first major surface portion 18 and a secondary or minor portion 46 of the first major surface portion 18. The secondary portion 46 can be folded along the third fold line 48 to be positioned with at least a portion of the third major surface portion 22 interposed between the secondary portion 46 and the second major surface portion 20, such that, in a folded position, the first, second and third major surface portions 18, 20, 22 of the at least one panel 12, 14 substantially form a pocket 10 closed in five directions along the first, second and third fold lines 38, 44, 48 between the first, second and third major surface portions 18, 20, 22, and with an opening 82 in a sixth direction to be connected to an airbag deployment seam 30 through a vehicle seat trim cover 72. Each of the first, second and third major surface portions 18, 20, 22 including at least one aperture 24, 34, 40 alignable, coaxially with one another when in the folded position.

A portion 32, 64 of a peripheral edges 16, 58 of the at least one panel 12, 14 connected to opposite sides of an airbag deployment seam 30 through a seat trim cover 72. The at least one panel 12, 14, when in a folded position, directing airbag deployment force toward the deployment seam 30. A sided airbag 74 can be stowed in a folded condition within the pocket 10 defined between the at least one flexible panel 12, 14 when in the folded position. An inflator 76 is provided in communication with the side airbag 72 for inflating the side airbag 72 to a deployed condition extending out of the pockets 10. The inflator 76 can be stored within the pocket 10 defined between the at least one panel 12, 14 when in the folded position. At least one inflator housing stud 78 extends outwardly from the inflator 76 through the coaxially aligned apertures 24, 34, 40 for engagement with a seat frame member 68.

Referring now to FIGS. 1-4, a vehicle seat 66 can include a frame 68, a pad 70 covering a least a portion of the frame 68, and a cover material 72 extending over at least a portion of the pad 70. The cover material 72 can include an airbag deployment seam 30. A reinforcement pocket 10 can be anchored to the frame 68 and can extend through the pad 70 toward the deployment seam 30. The reinforcement pocket 10 can include peripheral edge portions 32, 64 connected to opposite sides of the airbag deployment seam 30 through the seat trim cover 72 for directing airbag deployment force toward the deployment seam 30. The pocket can include a first flexible panel 54 of material having a first major surface 56 and a peripheral edge 58, and at least one aperture 60 formed adjacent a first portion 62 of the peripheral edge 58. A second flexible panel 84 of material has a first fold line 38, a second fold line 44, and a third fold line 48. The first fold line 38 defines a first portion 18 of a second major surface 86 to be positioned in opposing relationship with respect to the first major surface 56 of the first panel 54. The first fold line 38 defining a second portion 20 of the second major surface 86 to be folded along a second portion 88 of the peripheral edge 58 of the firsts panel 54. The second fold line 44 defining a third portion 22 of the second major surface 86 to be folded along a third portion 90 of the peripheral edge 58 of the first panel 54. The third fold line 48 defining a fourth portion 92 of the second major surface 86 to be folded along the first portion 62 of the peripheral edge 58 of the first panel 54, such that the first, second, third and fourth portions 18, 20, 22, 92 of the second flexible panel 84 substantially enclose the first panel 54 forming a pocket 10 substantially closed in five directions along the first, second, and third portions 62, 88, 90 of the peripheral edge 58 and the first and second major surfaces 56, 86, and with an opening 82 in a sixth direction to be connected to an airbag deployment seam 30 through a vehicle seat trim cover 72. The second, third, and fourth portions 20, 22, 92 including a corresponding number of apertures 24, 34, 40 to the apertures 60 formed adjacent the first portion 62 of the peripheral edge 58 of the first panel 54, and when folded, each aperture 24, 34, 40 coaxially aligning with a corresponding, aperture 60 formed in the first flexible panel 54. A side airbag 74 can be stowed in a folded condition within the pocket 10 defined between the first and second panels 54, 84. An inflator 76 is provided in communication with the side airbag 74 for inflating the side airbag 74 to a deployed condition extending out of the pocket 10. The inflator 76 can be stored within the pocket 10 defined between the first and second panels 54, 84. At least one inflator housing stud 78 extends outwardly from the inflator 76 through the coaxially aligned apertures 24, 34, 40, 60 for engagement with the seat frame member 68.

Referring now to FIG. 1, the peripheral edge portions 32 and 64 can be sewn into opposite sides of a seat trim cover deployment seam 30. To form pocket 10 for enclosing the side airbag 74 and inflator 76, the inflator housing studs 78 are passed through the apertures 60 formed in the second sheet 14, then through either the second apertures 34 formed in the second major surface portion 20 or through the third apertures 40 formed in the third major surface portion 22, then through the other of the apertures 34 or 40, and finally through the first aperture 24 formed in the first major surface portion 18 of the sheet 12. The inflator housing stud 78 are then secured to the seat frame member 68. It should be recognized that the order of folding the second major surface portion 20 with respect to the first major surface portion 18, and the third major surface portion 22 with respect to the first surface portion 18 are not limited to the configuration illustrated and described herein, but rather can include folding the third major surface portion 22 to be interposed between the second major surface portion and the first major surface portion 20, 18. In either case, the first, second, and third major surface portions 18, 20, 22 substantially define an enclosed pocket 10.

Referring now to FIG. 5, the pocket 10 can be formed for enclosing the side airbag 74 and inflator 76 by connecting the peripheral edge portions 32 and 64 to opposite sides of the seat trim cover airbag deployment seam 30 when installing the inflator 76 in the pocket, the inflator housing studs 78 are extended through the apertures 24, 34, 40 in any desired sequence to substantially define an enclosed pocket. The pocket 10 is substantially closed in five directions along the first, second and third fold lines 38, 44, 48 and with an opening 82 in a sixth direction toward the airbag deployment seam 30 through the vehicle seat trim cover 72. The inflator housing studs then being, secured to a seat frame member 68.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A side airbag seat reinforcement pocket comprising:
at least one sheet of material having a peripheral edge and divided into at least three major surface portions, a first major surface portion having at least one first aperture formed adjacent a first portion of the peripheral edge of the at least one sheet and an edge to be sewn into a seat trim cover seam opposite from the first portion of the peripheral edge, a second major surface portion having at least one second aperture formed adjacent a second portion of the peripheral edge of the at least one sheet, the second major surface portion to be folded along a first fold line between the first and second major surface portions in opposing relationship to the first major surface portion, a third major surface portion having at least one third aperture formed adjacent a third portion of the peripheral edge of the at least one sheet, the third major surface portion to be folded along a second fold line between the first and third major surface portions in opposing relationship to the second major surface portion, the at least one first, second, and third apertures located in coaxial alignment with respect to one another when the second and third major surface portions are folded about the first and second fold lines, such that the first, second, and third major surface portions substantially define an enclosed pocket; and a side airbag in a folded condition stowed within a pocket defined between the first and second major surface portions of the at least one sheet.

2. The side airbag seat reinforcement pocket of claim 1 further comprising:

the first major surface portion including a first minor surface portion, the first minor surface portion to be folded along a third fold line in opposing relationship to the third major surface portion to locate the at least one first aperture in coaxial alignment with the at least one second and third apertures.

3. The side airbag seat reinforcement pocket of claim 1, wherein the at least one sheet of material further comprises:

a first sheet and a second sheet of material, the first sheet defining the at least three major surface portions, and the second sheet defining a first flexible panel with a first surface and a peripheral edge, at least one aperture formed adjacent a portion of the peripheral edge.

4. The side airbag seat reinforcement pocket of claim 3 further comprising:

the first, second, and third major surface portions of the first sheet substantially enclosing the second sheet, when the second sheet is in opposing relationship with respect to the first sheet and the second and third major surface portions of the first sheet are folded over the second sheet along the first and second fold lines.

5. The side airbag seat reinforcement pocket of claim 3 further comprising:

the second sheet having an edge to be sewn into a seat trim cover seam along a portion of the peripheral edge opposite from the portion with at least one aperture formed adjacent thereto.

6. The side airbag seat reinforcement pocket of claim 1 further comprising:

the third major surface portion having an edge to be sewn into a seat trim cover seam along a portion of the peripheral edge of the at least one sheet opposite from the second portion.

7. The side airbag seat reinforcement pocket of claim 1 further comprising:

the second major surface portion having a corresponding number of apertures to the apertures formed adjacent the first portion of the peripheral edge of the first major surface portion and when folded each aperture coaxially aligning with a corresponding aperture formed in the first major surface portion of the at least one sheet.

8. The side airbag seat reinforcement pocket of claim 1 further comprising:

the third major surface portion of the at least one sheet having a corresponding number of apertures to the apertures formed adjacent the first portion of the peripheral edge of the first major surface portion and when folded each aperture coaxially aligning with a corresponding aperture formed in the first major surface portion of the at least one sheet.

9. The side airbag seat reinforcement pocket of claim 1 further comprising:

a minor surface portion defined by a fold line in the first major surface portion having a corresponding number of apertures to the apertures formed adjacent the second and third major surface portions and, when folded in opposing relationship to the third major surface portion, each aperture coaxially aligning with a corresponding aperture formed in the second and third major surface portions of the at least one sheet.

10. The side airbag reinforcement pocket of claim 1 further comprising:

an inflator in communication with the side airbag for inflating the side airbag to a deployed condition extending out of the pocket, the inflator stored within the pocket defined between the first and second major surface portions of the at least one sheet.

11. The side airbag reinforcement pocket of claim 10 further comprising:

at least one inflator housing stud extending outwardly through the coaxially aligned apertures for engagement with a seat frame member.

12. The side airbag reinforcement pocket of claim 1 further comprising:

a portion of the peripheral edge of the first and second major surface portions of the at least one sheet connected to opposite sides of an airbag deployment seam through a seat trim cover, the first and second major surface portions directing airbag deployment force toward the deployment seam.

13. The side airbag reinforcement pocket of claim 1 further comprising:

a vehicle seat having a frame, a pad covering at least a portion of the frame, and a cover material extending over at least a portion of the pad, the cover material having an airbag deployment seam, the first and second major surface portions defining a pocket, the pocket anchored to the frame and extending through the pad toward the deployment seam, the at least one sheet having peripheral edge portions connected to opposite sides of the deployment seam through the cover for directing airbag deployment force toward the deployment seam.

14. A side airbag seat reinforcement pocket comprising:

at least one flexible panel of material having a first fold line, a second fold line, and a third fold line, the first fold line extending between a first major surface portion and a second major surface portion, the second major surface portion to be positioned in opposing relationship with respect to the first major surface of the at least one panel, the second fold line extending between the first major surface portion and a third major surface portion, the third major surface to be folded along the second fold line to be positioned with the second major surface portion interposed between the first and third major surface portions, the third fold line extending between a primary portion of the first major surface portion and a secondary portion of the first major surface portion, the secondary portion to be folded along the third fold line to be positioned with at least a portion of the third major surface portion interposed between the secondary portion and the second major surface portion, such that, in a folded position, the first, second, and third major surface portions of the at least one panel substantially form a pocket closed in five directions along the first, second, and third fold lines between the first, second, and third major surface portions, and with an opening in a sixth direction to be connected to an airbag deployment seam through a vehicle seat trim cover, each the first, second, and third major surface portions including at least one aperture alignable coaxially with one another when in the folded position; and a side airbag in a folded condition stowed within the pocket defined between the at least one flexible panel when in the folded position.

15. The side airbag reinforcement pocket of claim 14 further comprising:

an inflator in communication with the side airbag for inflating the side airbag to a deployed condition extending out of the pocket, the inflator stored within the pocket defined between the at least one panel when in the folded position.

16. The side airbag reinforcement pocket of claim 15 further comprising:

at least one inflator housing stud extending outwardly through the coaxially aligned apertures for engagement with a seat frame member.

17. The side airbag reinforcement pocket of claim 14 further comprising:

a portion of a peripheral edge of the at least one panel connected to opposite sides of an airbag deployment seam through a seat trim cover, the at least one panel when in a folded position directing airbag deployment force toward the deployment seam.

18. In a vehicle seat having a frame, a pad covering at least a portion of the frame, and a cover material extending over at least a portion of the pad, the cover material having an airbag deployment seam, a reinforcement pocket anchored to the frame and extending through the pad toward the deployment seam, the reinforcement pocket having peripheral edge portions connected to opposite sides of the airbag deployment seam through the seat trim cover for directing airbag deployment force toward the deployment seam, the improvement of a side airbag reinforcement pocket comprising:

a first flexible panel of material having a first major surface and a peripheral edge and at least one aperture formed adjacent a first portion of the peripheral edge; and a second flexible panel of material having a first fold line, a second fold line, and a third fold line, the first fold line defining a first portion of a second major surface to be positioned in opposing relationship with respect to the first major surface of the first panel, the second fold line defining a second portion of the second major surface to be folded along a second portion of the peripheral edge of the first panel, the third fold line defining a third portion of the second major surface to be folded along a third portion of the peripheral edge of the first panel, and the first fold line defining a fourth portion of the second major surface to be folded along the first portion of the peripheral edge of the first panel, such that the first, second, third, and fourth portions of the second flexible panel substantially enclose the first panel forming a pocket substantially closed in five directions along the first, second, and third portion of the peripheral edge and the first and second major surfaces, and with an opening in a sixth direction to be connected to an airbag deployment seam through a vehicle seat trim cover, the second, third, and fourth portions having a corresponding number of apertures to the apertures formed adjacent the first portion of the peripheral edge of the first panel and when folded each aperture coaxially aligning with a corresponding aperture formed in the first flexible panel;

a side airbag in a folded condition stowed within the pocket defined between the first and second panels;

an inflator in communication with the side airbag for inflating the side airbag to a deployed condition extending out of the pocket, the inflator stored within the pocket defined between the first and second panels; and at least one inflator housing stud extending outwardly through the coaxially aligned apertures for engagement with the seat frame member.

19. A side airbag seat reinforcement pocket comprising:

at least one sheet of material having a peripheral edge and divided into at least three major surface portions, a first major surface portion having at least one first aperture formed adjacent a first portion of the peripheral edge of the at least one sheet and an edge to be sewn into a seat trim cover seam along a second portion of the peripheral edge opposite from the first portion, a second major surface portion having at least one second aperture formed adjacent a second portion of the peripheral edge of the at least one sheet, the second major surface portion to be folded along at least one first fold line between the first and second major surface portions in opposing relationship to the first major surface portion, a third major surface portion having at least one third aperture formed adjacent a third portion of the peripheral edge of the at least one sheet, the third major surface portion to be folded along a second fold line between the first and third major surface portions in opposing relationship to the second major surface portion, the at least one first, second, and third apertures located in coaxial alignment with respect to one another when the second and third major surface portions are folded about the first and second fold lines, such that the first, second, and third major surface portions substantially define an enclosed pocket; and a side airbag in a folded condition stowed within the enclosed pocket.

\* \* \* \* \*